Nov. 27, 1962     H. J. LOFTIS     3,065,941
MOTOR MOUNTING RING
Filed Sept. 21, 1959

INVENTOR.
HOMER J. LOFTIS
BY
HIS ATTORNEYS

United States Patent Office 3,065,941
Patented Nov. 27, 1962

1

3,065,941
MOTOR MOUNTING RING
Homer J. Loftis, Ironton, Ohio, assignor to Henrite Products Corporation, a corporation of Ohio
Filed Sept. 21, 1959, Ser. No. 841,346
3 Claims. (Cl. 248—26)

This invention relates to a motor mounting ring and more particularly to a resilient mounting ring of one piece construction; however, the invention is not necessarily so limited.

Conventional motor mounting rings comprise an inner ring member adapted to engage the hub of the motor, an outer ring member of larger diameter adapted to seat in a supporting bracket, and an intermediate annulus of elastomeric material bonded to the outer surface of the inner ring member and to the inner surface of the outer ring member. Typically, the inner and outer ring members are metallic and the intermediate elastomeric annulus is rubber.

The manufacture of such mounting rings requires several different pieces of manufacturing apparatus and several distinct manufacturing operations. First, there must be a forming die for the inner metal ring. Second, there must be a forming die for the outer metal ring. Third, there must be a mold for vulcanizing the elastomeric annulus between the inner and outer metal rings. This is a minimum of three pieces of apparatus with three manufacturing operations.

An object of the present invention is to provide a resilient motor mounting ring which may be manufactured with a single piece of apparatus and with a single manufacturing operation.

Another object of this invention is to provide a resilient mounting ring having a flexible design which enables the ring to be designed for varying yield characteristics.

Another object of the present invention is to provide a resilient mounting ring of one piece molded plastic construction.

Other objects and advantages reside in the construction of parts, the combination thereof, the method of manufacture and the mode of operation, as will become more apparent from the following description.

In the drawing, FIGURE 1 is a plan view of one embodiment of the resilient mounting ring of this invention.

Figure 1:
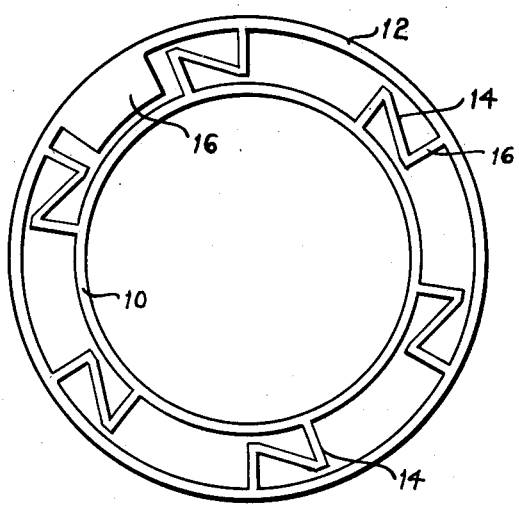

Referring to the drawing in greater detail, FIGURE 1 illustrates a one piece resilient mounting ring comprising an inner ring member 10, an outer ring member 12 of larger diameter disposed concentrically about the inner ring member, and a plurality of generally radial spoke portions 14 traversing the annular gap between the ring members at equispaced intervals. The spoke portions 14 each have a generally Z-shaped configuration, the opposite extremities of each spoke portion engaging the inner and outer ring members respectively. Interposed between one pair of adjacent spoke portions 14 is a stop element 16 which is integral with the outer ring member 12 and which projects radially into the annular gap between the inner and outer ring members. The function of this stop element 16 will be described subsequently.

The inner and outer ring members 10 and 12 are each cylindrical, such that they have a finite axial width. Preferably, the ring members and the spoke portions 14 all have the same axial width, and, as clearly shown in FIGURE 4, this axial width materially exceeds the thickness of the spoke portions. With this construction, axial movement of the inner ring member relative to the outer ring member is restrained while a yielding rotational movement of the inner ring member relative to the outer ring member is promoted.

In the preferred form of this invention, the mounting ring is injection molded using a thermoplastic material such as nylon, the entire mounting ring being molded in a single operation. In designing the mounting ring, the dimensions and configuration of the spoke portions 14 are adjusted to provide a desired resiliency. The adjustment depends upon the type of material used and the characteristics ultimately desired.

With regard to the embodiment of FIGURE 1, it will be observed that the opposite ends or legs of the Z-shaped spoke portions 14 extend radially and each has a length less than the radial distance across the gap between the ring members 10 and 12. This provides clearance so that there is radial flexibility in the mounting ring. Rotational or torsional flexibility is afforded by bending movement of the legs and flexing of the angles in the Z-shaped spoke portions. Thus, the inner ring member 10 is permitted restrained rotary movement relative to the outer ring member 12. The stop element 16 limits the rotational movement such that the spoke portions 14 will not be permanently deformed under torsional stress.

It is to be noted in regard to the embodiment of FIGURE 1 that the resistance of the spoke members 14 to a clockwise torque will not be identical to the resistance to a counterclockwise torque. Thus, a clockwise torque on the inner ring member 10 tends to close the angles of the Z configuration in the spoke members while a counterclockwise torque on the inner ring member 10 tends to open the angles of the Z configuration. Ordinarily, this difference in the resistance to torsional forces will not be important. However, in some applications it may be desired that the mounting ring have identical yield characteristics regardless of the direction of the torque.

Figure 2:
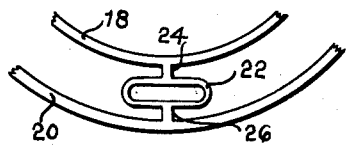
FIGURE 2 is a fragmentary plan view of a first modification.

In the embodiment of FIGURE 1, symmetrical yield characteristics can be obtained by reversing alternate spoke portions 14 so that regardless of the direction of the torque, half of the spoke portions will have closing angles while the other half will have opening angles. An an alternative, FIGURE 2 illustrates a modification wherein each of the individual spoke portions is symmetrical so as to resist torque equally regardless of the direction of the torque. This modification comprises an inner ring member 18 and an outer ring member 20, comparable to the ring members 10 and 12 of FIGURE 1. Spoke portions connecting the inner and outer ring members 18 and 20 are formed by a closed oval loop 22 located centrally in the annular gap between the ring members, and aligned radially disposed ribs 24 and 26 which connect diametrically opposite portions of the loop 22 to the ring members 18 and 20. Compression and expansion of the loops 22 allow for radial movement between the inner and outer ring members. Torsional loads on the ring members are accommodated by distortion of the loop 22 such that the radius of curvature in the opposite ends of the loops is increased.

Figure 3:
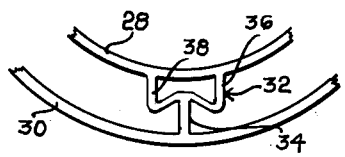
FIGURE 3 is a fragmentary plan view of a second modification.

FIGURE 3 illustrates another spoke configuration, wherein the spoke portion has symmetrical resistance to torsional loads. In this modification, inner and outer ring members 28 and 30 are connected by a spoke portion 32 having a general Y-shaped configuration. This spoke portion has a tail 34 connecting to the outer ring member 30 and generally parallel angular arms 36 and 38 connecting to the inner ring member 28. Radial and torsional flexibility in this configuration is afforded by bending of the arms 36 and 38.

The thing that is common to the embodiments of FIGURES 1, 2, and 3 is that, in each, the spoke portions connecting the inner and outer ring members follow a tortuous path between the two ring members as opposed to a straight line path. By virtue of this tortuous path, the spoke portion can elongate and contact (effectively) to accommodate torsional and radial loads.

Figure 4:
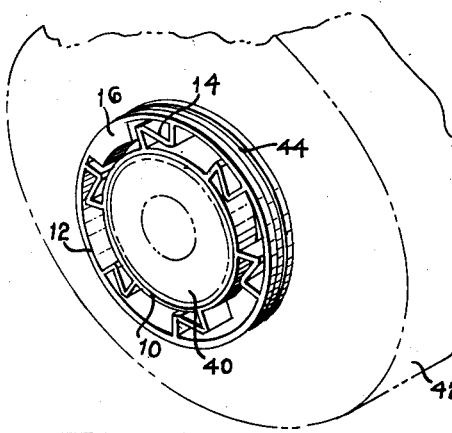
FIGURE 4 is a perspective view illustrating the preferred embodiment positioned upon a motor illustrated in fragmentary phantom detail.

FIGURE 4 illustrates the mounting ring of FIGURE 1 positioned on the hub 40 of a motor unit 42 illustrated in phantom detail. In attaching the mounting ring to the hub of the motor the inner ring member 10 is press-fitted on the hub 40. Ordinarily, the outer ring member 12 is provided with a circumferential groove 44 used in attaching the mounting ring to a mounting bracket. The function of this groove will be more fully described in the following.

Figure 5:
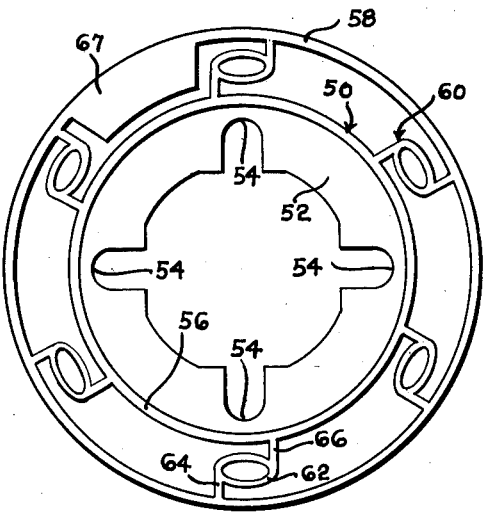
FIGURE 5 is a plan view of a third modification.

FIGURE 5 illustrates a modified type of mounting ring wherein the inner ring member is replaced by a generally cup-shaped member 50 having an open centered base or flange 52 and a cylindrical rim or wall 56. The base 52 is provided with a plurality of radial notches 54 which are used in securing the mounting ring to a motor, as will be described more fully subsequently.

Encircling the cup-shaped member 50 is a ring member 58 of larger diameter, there being an annular gap between the ring member 58 and the rim 56 of the cup-shaped member 50. Traversing this annular gap are a plurality of spoke portions 60. These spoke portions 60 each comprise a closed oval loop 62, diametrically opposite portions of the loop being connected to the ring member 58 and the rim 56, respectively, by radial ribs 64 and 66. In this spoke portion, relative radial movement of the cup-shaped member 50 and the ring member 58 is accommodated by distortion of the loop 62. Relative torsional movement produces an elongation or contraction of the loop 62 and a bending movement of the ribs 64 and 66. A limit on the torsional yield of the spoke portions is established by a stop element 67 integral with the outer ring member 58. Like the embodiments of FIGURES 1, 2, and 3, the mounting ring of FIGURE 5 is preferably of one piece molded construction.

It will be observed that the configuration of the spoke portions in the embodiment of FIGURE 2 is related to the configuration of the spoke portions in the embodiment of FIGURE 5. In FIGURE 2 the ribs 24 and 26 engage the loop 22 at points which lie on a diametric chord extending radially across the gap between the ring members 18 and 20. In the spoke portions of FIGURE 5, the ribs 64 and 66 engage the loop 62 at points which lie on an arc disposed circumferentially in the annular gap between the cup-shaped member 50 and the outer ring member 58.

Figure 6:
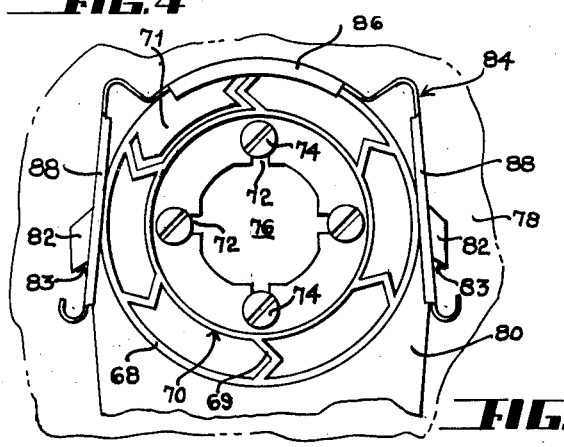
FIGURE 6 is a plan view illustrating a fourth modification showing the resilient mounting ring assembled on a mounting bracket and positioned on the hub of a motor shown in fragmentary phantom detail.

FIGURE 6 illustrates the assembly of a mounting ring in a mounting bracket. The mounting ring comprises an inner cup-shaped member 70 similar in shape to the cup-shaped member 50 of the embodiment of FIGURE 5. The cup-shaped member 70 is provided with radially disposed notches 72 which receive screws 74 threadedly engaging the end face of the hub 76 of a motor 78. The screws 74 seated in the notches 72 prevent rotation of the mounting ring relative to the hub of the motor. The cup-shaped member 70 is encircled by a ring member 68 which is of larger diameter. The gap between the cup-shaped member 70 and the ring member 68 is traversed by spoke portions 69. These spoke portions are generally V-shaped, the opposite extremities of the spoke portions being secured to the cup-shaped member 70 and to the ring member 68. The V-shaped configuration permits both radial and torsional flexibility in the mounting ring through opening and closing of the angle therein. A limit on both torsional and radial deflection is established by a stop element 71 located intermediate one pair of spaced spoke portions 69.

The mounting bracket for the resilient mounting of FIGURE 6 comprises a cradle member 80 punched from suitable sheet stock. This cradle member has an arcuate yoke portion into which the mounting ring is seated. For this purpose, the outer ring member 68 of the mounting ring has an annular groove in the outer wall thereof similar to the groove 44 illustrated in FIGURE 4.

The mounting ring is locked onto the cradle member 80 by means of a spring clip 84. This spring clip is essentially an elongated strip of spring metal, the central portion of which is curved to match the periphery of the mounting rings. Flanges 86 at the margins of this curved central portion secure the spring clip to the mounting ring so that it will not slide off. The opposite ends of the spring clip are slotted for engagement with tongue portions 82 projecting laterally from the outer margins of the cradle member 80. This spring clip is so designed that it must be deformed to seat the tongue portions 82 of the cradle member in the slotted end portions of the clip. The natural resiliency of the spring metal in the clip then draws the extreme ends of the clip firmly into notches 83 formed under the projections 82 of the cradle member. Flanges 88 in the end portions of the spring clip assist in making these end portions rigid so that the resiliency in the spring clip will exert the desired bias.

It will be observed that the mounting bracket of FIGURE 6 supports the mounting ring without in any way interfering with the yielding action of the mounting ring. Thus the inner cup-shaped member 70 of the mounting ring is free to execute both radial and rotational movement within the outer ring 68, subject to the limitations of motion imposed by the spoke portions 69 and the stop element 71. The outer ring member 68, however, is secured against both axial and radial movement by the mounting bracket.

While five specific types of spoke portions have been illustrated, it is to be understood that many other designs of resilient spoke portions may be created within the scope of the present invention. Thus, the feature which is common to the five designs illustrated, namely, a tortuous path across the annular gap, may be employed in many other configurations without departing from the present invention.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A resilient mounting ring comprising a pair of ring members of different diameter, the smaller ring member being disposed concentrically within the larger ring member, there being an annular gap therebetween, a plurality of resilient tortuous spoke members extending generally radially across said gap at substantially equal intervals, said spoke members each having an axial width which exceeds the thickness thereof, said spoke members elongating to permit said ring members to rotate one relative to the other upon the application of a torsional bias thereto, and means for limiting the rotational movement of said ring members one relative to the other to a maximum angle smaller than that otherwise permitted by the resiliency of said spoke members.

2. A resilient mounting ring comprising a pair of ring members of different diameter, the smaller ring member being disposed concentrically within the larger ring member, there being an annular gap therebetween, a plurality of resilient tortuous spoke members extending generally radially across said gap at substantially equal intervals, said spoke members each having an axial width which exceeds the thickness thereof, said spoke members elongating to permit said ring members to rotate one relative to the other upon the application of a torsional bias thereto, and means for limiting the rotational movement of said ring members one relative to the other, said means comprising a stop element fixedly secured to one ring member and projecting into said gap adjacent one of said spoke members, said stop element coacting with the adjacent spoke member to limit rotary movement of one ring member relative to the other ring member.

3. A resilient one piece mounting for an electric motor comprising a generally cup-shaped member including an annular portion forming the wall of said cup-shaped member and an integral flange projecting inwardly from one margin of said wall forming the base for said cup-shaped member, said wall being adapted to encircle the hub of the electric motor and said flange being adapted for attachment to the end face of said hub in juxtaposed relation thereto, an outer ring member having a diameter larger than that of said cup-shaped member encircling said wall in concentric relation thereto, there being an annular gap between said wall and said ring member, and a plurality of spoke members distributed at substantially equal intervals in said gap securing said outer ring member to said wall, said spoke members being of resilient material and extending tortuously across said gap, the axial width of each spoke member exceeding the thickness thereof.

References Cited in the file of this patent

UNITED STATES PATENTS

| | | |
|---|---|---|
| 1,167,757 | Hess | Jan. 11, 1916 |
| 1,286,369 | McCourt | Dec. 3, 1918 |
| 1,698,306 | Hull | Jan. 8, 1929 |
| 2,112,473 | Tolerton | Mar. 29, 1938 |
| 2,756,013 | Cunningham | July 24, 1956 |
| 2,936,141 | Rapata | May 10, 1960 |

FOREIGN PATENTS

| | | |
|---|---|---|
| 50,841 | Netherlands | Sept. 15, 1941 |